July 12, 1932.  A. G. BENARD  1,866,792
MULTIPLE INSULATOR TRIMMING MACHINE
Filed March 3, 1930  4 Sheets-Sheet 1
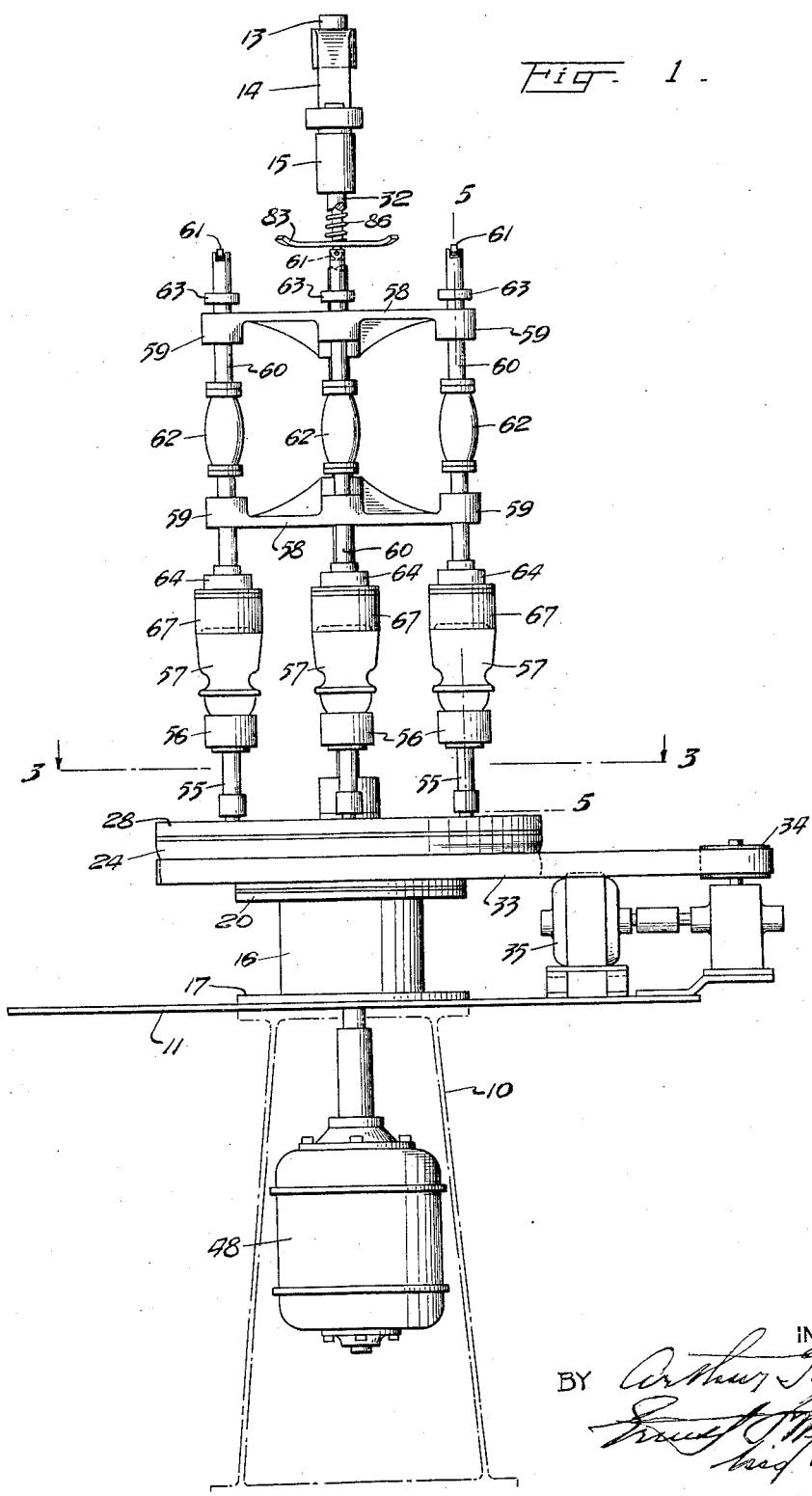

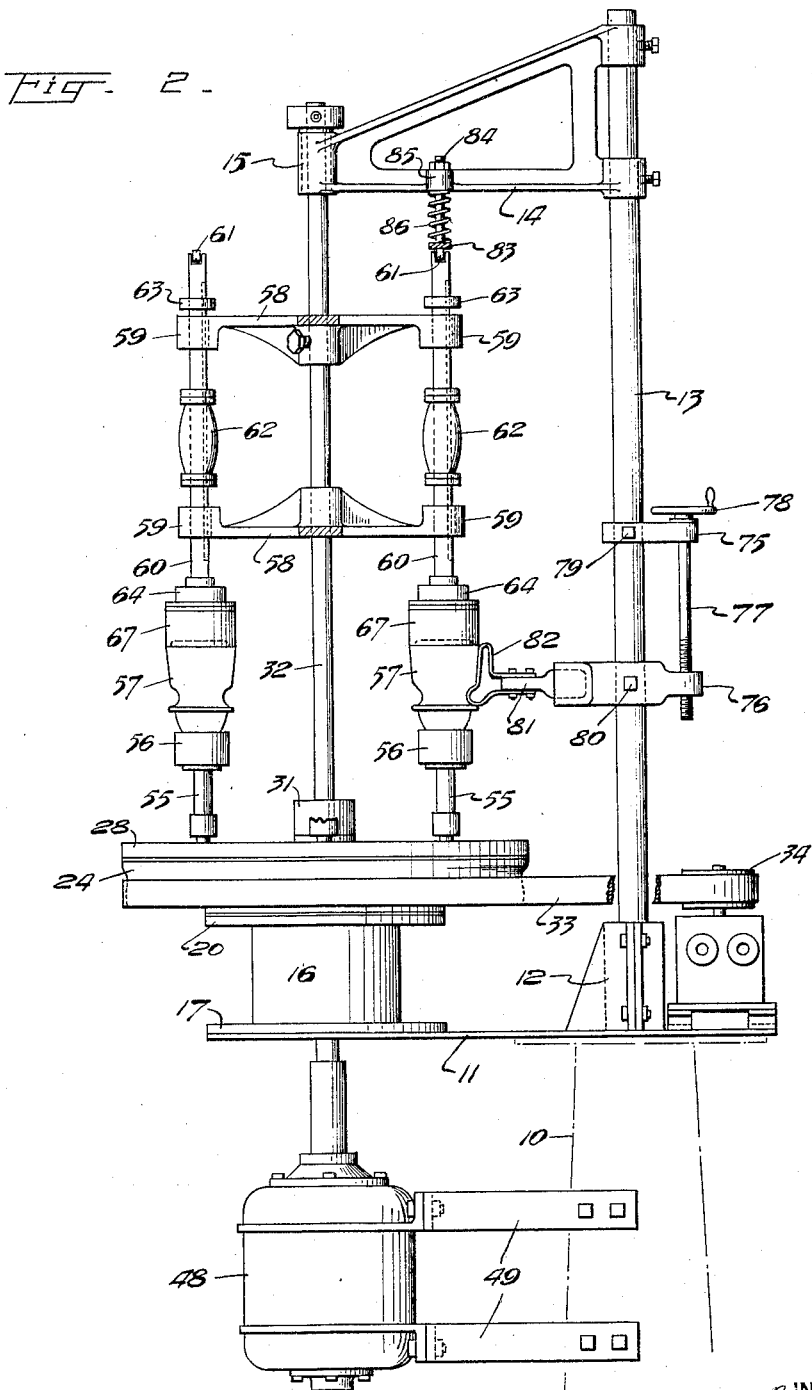

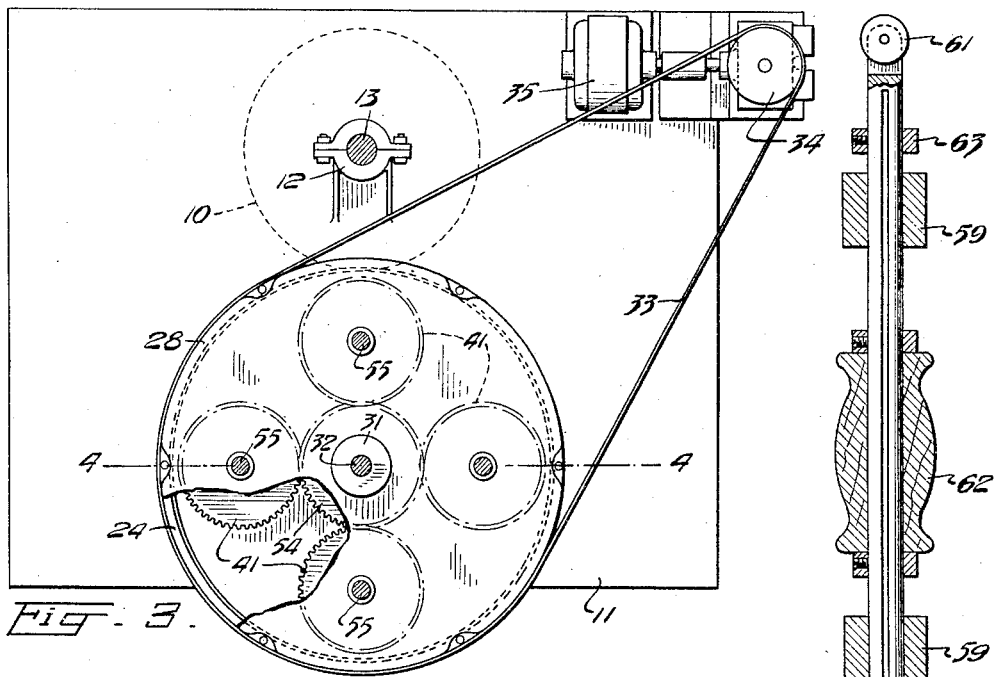

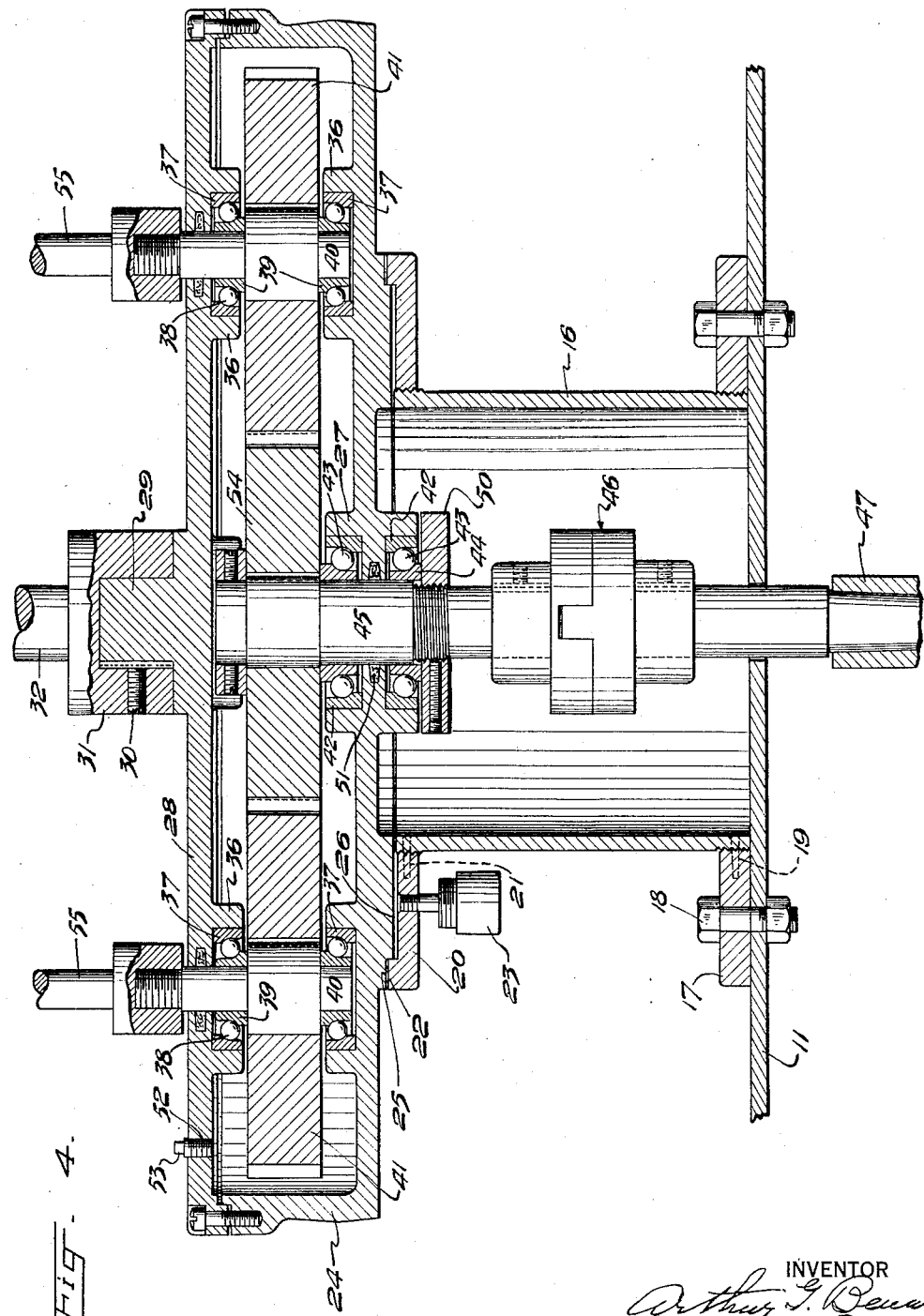

Patented July 12, 1932

1,866,792

UNITED STATES PATENT OFFICE

ARTHUR G. BENARD, OF ROCHESTER, NEW YORK, ASSIGNOR TO THE LOCKE INSULATOR CORPORATION, OF BALTIMORE, MARYLAND, A CORPORATION OF MARYLAND

MULTIPLE INSULATOR TRIMMING MACHINE

Application filed March 3, 1930. Serial No. 432,934.

The invention relates to the manufacture of porcelain insulators and has special reference to means for giving them the desired external contour.

It is well known that it is a common practice to form insulators by plunging, that is to say by placing a billet of clay in a mold or form, and then subjecting it to the action of a longitudinally movable and rotating plunger, the form or mold giving, roughly, the outside shape and the plunger giving the insulator the proper internal shape. Subsequently it is a common plan to mount the insulator on some sort of rotating spindle and trim off the outside to the exact shape desired by means of a hand tool. This work is comparatively slow and the insulators are not necessarily uniform as there is no accurate gauge by which they will all be trimmed off to the exact same degree.

It is with the above facts in view that I have devised the present invention which has for its general object the provision of a machine by means of which the trimming of a plurality of insulators may be carried out at the same time and all trimmed to exactly the same extent so that the product will be uniform regardless of the number needed to fill an order.

An important object of the present invention is to provide a machine of this character which will operate very rapidly and which may be taken care of by two operators, one to place the untrimmed insulators on the holding spindles therefor and the other to remove them after they have been dressed off.

Another object of the invention is to provide a machine of this character embodying a plurality of spindles all rotating individually with the entire assembly rotating as a whole so that each and every insulator will be worked upon by the same cutting tool, this insuring absolute uniformity.

Another object of the invention is to provide a machine of this type embodying a simple arrangement of gearing for effecting the planetary movement.

Still another object is to provide means for adjusting the position of the trimming tool depending upon the desired contour of the insulators.

An additional object is to provide a machine for this purpose which will be simple and inexpensive to manufacture and assemble, easy to use, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of the complete machine,

Figure 2 is an elevation taken at right angles to Figure 1,

Figure 3 is a cross sectional view taken on the line 3—3 of Figure 1,

Figure 4 is a vertical cross section on substantially the line 4—4 of Figure 3,

Figure 5 is a vertical longitudinal section through one of the spindle devices carrying the insulators, the view being taken on the line 5—5 of Figure 1, Figure 6 is an enlarged detail view showing the cam or track for holding the successive spindles down, and Figure 7 is a cross section taken on the line 7—7 of Figure 6.

Referring more particularly to the drawings the numeral 10 designates a suitable stationary support, the details of which are not disclosed as they are utterly immaterial. Mounted on the support is a frame structure including a horizontal member 11 having a clamping portion 12 within which is secured the lower end of a vertical rod 13 provided at its upper end with a laterally extending top member 14 terminating in a bearing 15. Secured upon the horizontal or platform portion 11 is the lower end of a hollow column 16 which might be secured in place in any desired manner but which is here represented as of cylindrical shape with its lower end threaded into a ring 17 bolted at 18 on to the platform 11, it being preferable that there be pins 19 passing through the lower end of the member 16 and into the ring 17 to prevent relative rotation. The upper end of the member 16 is also preferably threaded and screwed into a ring 20 to which it is additionally pinned at 21. The ring 20 constitutes a guide or bearing and has its outer edge formed with an upstanding flange 22 for a purpose to be described. I have also shown a grease cup or other lubricating device 23 carried by the ring 20 for supplying lubricant upon the top thereof. All of the above described parts are stationary.

Rotatably mounted upon the ring 20 is a gear box or casing 24 having a bearing portion 25 engaging upon the flange 22 and having a reduced portion 26 located within the confines of the flange. At the center of its bottom this gear casing is formed with a hub 27 containing a bearing structure to be described. The top of the gear box or casing is closed by a cover plate 28 fastened thereto and provided centrally with an upstanding projection 29 upon which is keyed and preferably secured by a set screw 30 a socket member 31 on the lower end of an upstanding rod or shaft 32 which extends rotatably through the bearing 15 at the top of the frame. The gear box assembly is intended to be rotated and the exterior of the member 24 is therefore formed with a pulley face about which is engaged a belt 33 in turn trained about a pulley 34 driven, through the interposition of any suitable reducing gears, not shown, by an electric motor 35 which is mounted on the platform 11 at some convenient location.

The bottom of the gear casing 24 and the cover plate 28 thereof are formed at a plurality of preferably equally spaced points with sockets 36 extending toward each other and containing ball races 37 engaged by bearing balls 38 which in turn roll upon races 39 carried by stub shafts 40 which are thus freely rotatable with respect to the gear casing. Each of these shafts has keyed thereon a spur gear 41. Within the hub portion 27 above referred to are bearing structures including outer races 42 within which are located bearing balls 43 rolling upon inner races 44 on a vertical central shaft 45 detachably coupled as at 46 to the shaft 47 of an electric motor 48 suitably supported as by brackets 49 secured to the support 10. Beneath the hub 27 the shaft 45 may carry a collar 50. At the central portion of the hub structure there is preferably a packing gasket 51 to prevent creeping of lubricant along the shaft, it being preferable that the gear box 24 be filled with grease which may be introduced through a suitable filling opening 52 normally closed by a removable plug 53. Within the casing 24 the shaft 45 carries a master gear 54 which meshes with all of the gears 41 so that when the shaft 47 is rotated all of the gears and consequently all of the stub shafts 40 will be rotated independently of the rotation of the gear box itself.

Mounted upon the projecting upper ends of the stub shafts 40 are spindle members 55 here disclosed as screwed in place though it is readily apparent that some other form of attachment might be provided. Each of these spindle members carries a socket 56 which may be constructed of rubber so as to be capable of holding an insulator 57 to be trimmed without damaging it. Carried by the central rod 32 is a plurality of cross arms 58 of spider-like form terminating at their ends in guides 59 through which are splined spindle members 60 provided at their upper ends with rollers 61 for a purpose to be described and provided intermediate their ends with grips 62 for manual operation. The spindle members 60 are capable of longitudinal movement and the downward movement may be limited by adjustably mounted collars 63. Secured upon the lower portion of each spindle member 60 is a cup-like member 64 within the confines of which the spindle is formed with a reduced extension 65 upon which is rotatable a sleeve 66 carrying a socket member 67 preferably formed of rubber or other yieldable material and arranged above and in spaced relation to the previously described socket member 56. The sleeve 66 may be held against displacement longitudinally of the spindle by a washer 68 held in place by a screw 69 entering the end of the spindle. Clearly, any equivalent connection may be provided in lieu of what is shown and described. Within the cup member 64 is a ball bearing structure including races 70 and 71 having bearing balls 72 therebetween. At the edge of the cup member 64 there is preferably provided a gasket or packing 73 bearing against the top of the horizontal flange 74 on the sleeve member 66 to prevent leakage of lubricant and to prevent grit from entering and gaining access to the bearing.

Mounted adjustably upon the upstanding stationary rod 13 are bracket members 75 and 76 through the former of which is rotatably mounted a shaft 77 equipped with a hand wheel 78. The lower end of this rod is threaded and screwed into the bracket 76 for the purpose of adjusting the height thereof along the rod 13. A set screw 79 is provided for fastening the bracket 75 in any desired location and a set screw 80 is also provided for securing the bracket 76 firmly in place after the desired adjustment thereof by means of the rod 77 has been effected. The bracket 76 carries the cutter for trimming the insulators, this cutter being shown as comprising a shank 81 with a blade 82 secured thereto. In actual practice the blades used for this purpose are very conveniently formed from a strip of thin metal bent into shape corresponding to the desired configuration or contour of the insulator.

It is intended that the spindle members 60 be moved manually by means of the grips 62 so that the green insulators to be trimmed may be inserted between the socket members 56 and 67. It becomes necessary to hold these insulators firmly in place while they are being acted upon by the cutter and to accomplish this I provide a curved track 83 in the path of travel of the rollers 61 at the top of the spindles, this track being carried by a rod 84 slidable through a boss 85 on the top frame member 14, a coil spring 86 surrounding the rod and engaging the track for urging it downwardly while permitting it to yield in case of necessity.

In the use of the machine, the operator moves the successive spindles 60 upwardly by means of the grips 62 so that the insulators to be trimmed may be placed between the socket members 56 and 67, the head of the insulator being received within the former and the edge of the latter engaging between the depending skirts of the insulator. These socket members must naturally conform at least to a great extent to the shape and size of the insulators to be trimmed and the intention is that the machine be provided with a set of such socket members of different sizes and shapes, all of which would naturally be interchangeable so as to take care of insulators of different types. The weight of the parts will be sufficient to prevent the insulators from displacement prior to and after trimming. The gear case 24 carrying all of the spindles is rotated at the desired speed by the motor 35. When the motor 48 is in operation the master gear 54 is rotated and will drive all of the gears 41, stub shafts 40 and lower spindle members 55. The insulators are of course also rotated. It will be noted that the upper spindle members 60 do not rotate as they are splined through the guides 59, the upper socket members 67 and sleeve 66 being rotatable with the insulators. As the gear box turns the successive insulators are brought into contact with the cutter 82 which will pare off any surplus material from the insulator so that it will be dressed down to the proper size and shape. Just before each insulator reaches the cutter the roller 61 at the top of that particular spindle 60 passes beneath and in engagement with the track 83 so that the insulator will be held firmly. By making the socket members 56 or 67 of rubber or some suitable material it is apparent that there is no danger of damaging the insulator even though it is in a somewhat plastic condition as it must be to permit the cutter to operate properly. After the insulators are trimmed they are of course removed from between the socket members. In actual practice I have found that the machine can be satisfactorily operated by one workman who can place insulators on the spindles and remove the finished or trimmed insulators at the rate of 780 or more per hour as compared with the usual methods and means which will effect an output of not more than 300 per hour. There is therefore obviously a noticeable saving in time and labor. From experience I have found that the gear case and all the mechanism carried thereby may be rotated at approximately five revolutions per minute while the insulators may be rotated at a speed of about twelve hundred revolutions per minute. There is no limitation as to these speeds but they are mentioned by way of illustration and to bring out the feature that the machine is capable of having a large output as according to the speed of rotation of the gear box as a whole the machine will trim twenty insulators per minute and cut them all to the exact same size and shape. If by chance the operator should skip and omit placing an insulator in position no harm will result as the stop collar 63 on the idle spindle would then prevent it from dropping down to a sufficient extent to cause the upper socket member 67 to engage the cutter. This is of course a minor detail but as it is a safety factor it is mentioned.

From the foregoing description and a study of the drawings it will be apparent that I have thus provided a simple and very easily operated machine for rapidly and accurately trimming insulators in large quantities. Ample provision has been made for any and all necessary adjustments. It is thought that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a machine of the character described, a plurality of individually rotating insulator carriers, relatively stationary cutting means, and means for moving said carriers to bring the insulators thereon successively into engagement with the cutting means.

2. A machine of the character described comprising a plurality of insulator carrying elements, means for rotating said elements individually, means for rotating all of said elements as a group, and stationary cutting means disposed in the path of travel of the successive insulators carried by the supporting elements.

3. A machine of the character described comprising a plurality of insulator carrying elements, means for clamping insulators upon said elements, means for rotating said elements individually, means for rotating all of said elements as a group, cutting means disposed in the path of travel of the successive insulators carried by the supporting elements, and means for adjusting the position of the cutting means.

4. A machine of the character described comprising a rotatable support, means for rotating the same, a plurality of insulator carriers mounted on said support, spring pressed members for clamping insulators upon said elements, means for rotating said carriers individually, and cutting means disposed in the path of travel of insulators carried by said carriers.

5. In a machine of the character described, a support, a plurality of elements mounted thereon and carrying insulators, planetary transmission mechanism for rotating the support and for rotating said elements individually, cutting means disposed in the path of travel of the insulators carried by said elements, and means positively clamping the insulators during cutting thereof.

6. In a machine of the character described, a support, a plurality of members rotatable thereon and having means for axially clamping insulators thereon, cutting means, and means for moving said support to bring the successive insulators into engagement with the cutting means.

7. In a machine of the character described, a stationary support, a movable support, a plurality of members rotatably mounted on said movable support, means on said members for holding insulators in axially clamped relation, cutting means carried by said stationary support, and means for moving said movable support to bring the successive insulators into engagement with said cutting means while they are rotating.

8. In a machine of the character described, a stationary supporting structure, a movable support thereon, a plurality of members rotatably mounted on said movable support and having means for holding insulators to be trimmed, means for rotating all of said members individually and simultaneously, cutting means on said stationary structure, and means for moving the movable support to bring the rotating insulators into engagement with the cutting means, and means for applying axial clamping pressure upon the insulators during cutting thereof.

9. In a machine of the character described, a stationary supporting structure, a movable support thereon, a plurality of members rotatably mounted on said movable support and having means for holding insulators to be trimmed, means for rotating all of said members, individually and simultaneously cutting means on said stationary structure, and means for moving the movable support to bring the rotating insulators into engagement with the cutting means, the insulator holding means comprising spaced socket members urged into clamping engagement with the insulators.

10. In a machine of the character described, a stationary supporting structure, a movable support thereon, a plurality of members rotatably mounted on said movable support and having means for holding insulators to be trimmed, means for rotating all of said members individually and simultaneously, cutting means on said stationary structure, means for moving the movable support to bring the rotating insulators into engagement with the cutting means, and screw means for adjusting the vertical position of the cutting means.

11. In a machine of the character described, a stationary supporting structure, a movable support thereon, a plurality of members rotatably mounted on said movable support and having means for holding insulators to be trimmed, means for rotating all of said members individually and simultaneously, guide means on said stationary structure, a carriage slidable on said guide carrying cutting means, means for moving the movable support to bring the rotating insulators into engagement with the cutting means operatively connected with the carriage, and screw means for varying the position of the cutting means.

12. In a machine of the character described, a stationary support, a rotatable support thereon, a plurality of members rotatably mounted on said rotatable support and including means for clampingly holding insulators to be trimmed, means for rotating all of said members at the same speed, cutting means carried by the stationary support, and means for rotating said rotatable support to bring the insulators successively into engagement with the cutting means.

13. In a machine of the character described, a stationary support, a rotatable support thereon, a plurality of members rotatably mounted on said rotatable support and including means for clampingly holding insulators to be trimmed, means for rotating all of said members at the same speed, cutting means carried by the stationary support, means for rotating said rotatable support to bring the insulators successively into engagement with the cutting means, each of said members including spaced elements receiving the insulators between them, and means on the stationary support for urging said elements toward each other during the cutting action.

14. In a machine of the character described, a stationary support, a rotatable support thereon, a plurality of members rotatably mounted on said rotatable support for holding insulators to be trimmed, means for rotating all of said members, cutting means, means for rotating said rotatable support to bring the insulators successively into engagement with the cutting means while they are rotating, downwardly spring pressed members located above and clampingly engaging the insulators, and stationary track means located in the path of and cooperating with said last named members for maintaining them in their lowermost positions during cutting of the insulators.

15. In a machine of the character described, a stationary support, a rotatable support thereon, a plurality of members rotatably mounted on said rotatable support for holding insulators to be trimmed, means for rotating all of said members, cutting means, means for rotating said rotatable support to bring the insulators successively into engagement with the cutting means while they are rotating, downwardly spring pressed members located above and clampingly engaging the insulators, stationary track means located in the path of and cooperating with said last named members for maintaining them in their lowermost positions during cutting of the insulators, and means resiliently urging said track means downwardly.

In testimony whereof I affix my signature.

ARTHUR G. BENARD.